(12) United States Patent
Yoon (10) Patent No.: US 8,100,681 B2
(45) Date of Patent: Jan. 24, 2012

(54) MOLDING A BATTERY

(75) Inventor: Heui-Sang Yoon, Cheonan-si (KR)

(73) Assignee: Samsung SDI Co., Ltd., Gongse-dong, Giheung-gu, Yongin-si, Gyeonggi-do (KR)

(*) Notice: Subject to any disclaimer, the term of this patent is extended or adjusted under 35 U.S.C. 154(b) by 0 days.

(21) Appl. No.: 12/686,553

(22) Filed: Jan. 13, 2010

(65) Prior Publication Data

US 2010/0112121 A1 May 6, 2010

Related U.S. Application Data

(62) Division of application No. 11/065,581, filed on Feb. 25, 2005, now Pat. No. 7,731,766.

(30) Foreign Application Priority Data

Mar. 15, 2004 (KR) ................................ 2004-17436
Mar. 30, 2004 (KR) ................................ 2004-21423

(51) Int. Cl.
*B29C 70/72* (2006.01)

(52) U.S. Cl. .................... 425/116; 264/263; 264/272.21; 425/129.1; 425/588

(58) Field of Classification Search ................. 425/116, 425/125, 129.1, 572, 588; 264/263, 272.21
See application file for complete search history.

(56) References Cited

U.S. PATENT DOCUMENTS

| | | | | |
|---|---|---|---|---|
| 2,418,823 A | * | 4/1947 | Desimone | 249/94 |
| 4,079,911 A | * | 3/1978 | Wirtz et al. | 249/78 |
| 5,449,698 A | * | 9/1995 | Mabuchi et al. | 521/51 |
| 5,476,619 A | * | 12/1995 | Nakamura et al. | 264/45.5 |
| 5,536,458 A | * | 7/1996 | Kawakita et al. | 264/46.6 |
| 5,741,530 A | * | 4/1998 | Tsunoda | 425/116 |
| 6,210,824 B1 | | 4/2001 | Sullivan et al. | |
| 7,248,021 B2 | | 7/2007 | Kozu et al. | |
| 2003/0003357 A1 | | 1/2003 | Tamai et al. | |

FOREIGN PATENT DOCUMENTS

| | | |
|---|---|---|
| CN | 1435900 A | 8/2003 |
| JP | 02-192130 A | 7/1990 |
| JP | 2003-017016 A | 1/2003 |
| JP | 2003-022789 A | 1/2003 |
| JP | 2003-229105 A | 8/2003 |
| JP | 2004-006213 A | 1/2004 |
| WO | WO 03/081695 | 10/2003 |

* cited by examiner

*Primary Examiner* — Robert B Davis
(74) *Attorney, Agent, or Firm* — Robert E. Bushnell, Esq.

(57) ABSTRACT

A mold for a battery, such as a secondary battery, and a method of molding a battery, such as a secondary battery, using the mold, uses a minimum amount of a molding substance, such as a resin, has its molding time shortened, and has a safety vent of a can being prevented from being fractured by high pressure during a molding process. Runners, through which a resin flows, are arranged parallel to cavities and the safety vent of the can is positioned closest to the gates, into which a resin is injected after the can and a protective circuit board are seated in the cavities. Due to the structure of the runners of the mold and the location of the safety vent of the can, the amount of resin used and the molding time are reduced. A fracture of the safety vent is avoided since a lower pressure occurs at the location closest to the gates during a resin filling process.

8 Claims, 8 Drawing Sheets

MOLDING A BATTERY

CLAIM OF PRIORITY

This application makes reference to, incorporates the same herein, and claims all benefits accruing under 35 U.S.C. §119 from applications for MOLD FOR SECONDARY BATTERY and METHOD FOR MOLDING SECONDARY BATTERY earlier filed in the Korean Intellectual Property Office on 15 Mar. 2004 and 30 Mar. 2004 and there duly assigned Serial No. 2004-17436 and 20046-21423. Furthermore, this application is a divisional of Applicants' Ser. No. 11/065,581 filed in the U.S. Patent & Trademark Office on 25 Feb. 2005, and assigned to the assignee of the present invention.

BACKGROUND OF THE INVENTION

1. Field of the Invention

The present invention relates to molding a battery, and more particularly, the present invention relates to a mold for a battery and a method of molding a battery, such as a secondary battery, using the mold, wherein a minimum amount of a molding substance, such as a resin, is used to retain a board, such as a protective circuit board, on the battery, resulting in the molding time using the resin being shortened and a safety vent of a battery can being prevented from being fractured by high pressure during a molding process.

2. Description of the Prior Art

As generally known in the art, a secondary battery, particularly a square-type lithium ion secondary battery electrically connects a protective circuit board to the positive and negative terminals of a can (battery sheath), in order to protect the battery from overcharging, over-discharging, an over-current, a short due to an external load, and the like. The can has a safety vent, which has a smaller wall thickness than that of the remainder of the can, formed on a side of the negative terminal so that if abnormal pressure occurs, the safety vent is fractured and internal gas is discharged to the exterior.

Both the can and the protective circuit board are contained in a sheath cover, which is composed of an upper cover and a lower cover, and are shipped as a product, in order to enhance the mechanical coupling strength between the can and the protective circuit board and protect them from external environments.

Recently, a method has been used wherein the gap between the can and the protective circuit board is filled with a resin or wherein the can and the protective circuit board are completely coated with a resin, in order to reduce the number of parts and improve the productivity. For example, upper and lower molds are provided with cavities, in which cans and protective circuit boards are to be contained, and gates and runners, which are connected to the cavities and act as channels for the resin during filling. Both the cans and the protective circuit boards are then seated on the cavities of the upper and lower molds and a resin, which has high temperature and high pressure, is injected toward the cavities through the runners and the gates, which are in communication with the runners. As a result, the cans and protective circuit boards are firmly mechanically retained by the resin.

However, such molds have a problem in that the runners, which act as channels for the resin, are formed a great distance away from the cavities and the amount of resin, which remains in the runners and the gates, is larger than that which is used to fill the gap between the cans and the protective circuit boards. This wastes the resin. In particular, after the resin molding is completed and the batteries are removed from the molds, the resin, which remains in the runners and the gates of the molds, is in a hardened state. Consequently, the expensive resin, which cannot be reused, must be removed from the runners and gates and disposed of.

In addition, it takes a long time for the resin to reach the cavities, because the runners are positioned away from the cavities and are very long. This prolongs the filling time. It is also likely that the cavities, in particular, the gap between the cans and the protective circuit boards, are not completely filled with the resin and the process ends in that state. This results in a poor molding of the secondary battery.

Conventional resin molding methods also have a problem in that, since the safety vent of the can is positioned farther from the gate into which the resin is injected, the safety vent is vulnerable to fracture due to the resin filling pressure. This is because the farther from the gate into which the resin flows, the higher the air pressure due to the resin filling becomes, and the safety vent, which has a smaller wall thickness than that of the remainder of the can, can be fractured toward the interior of the can by such high pressure.

If the safety vent is fractured in this way, a secondary problem can occur, i.e., the resin at a high pressure can penetrate into the can, and the electrolyte can easily leak to the exterior along the interface between the can and the resin during use of the battery.

SUMMARY OF THE INVENTION

Accordingly, the present invention has been made to solve the above-mentioned problems occurring in the prior art, and an object of the present invention is to provide a mold for a battery, such as a secondary battery, that minimizes the waste of a molding substance, such as a resin, used to retain a board, such as a protective circuit board, in a battery can.

Another object of the present invention is to provide a mold for a battery that minimizes the molding time using a resin.

Still another object of the present invention is to provide a method of molding a battery that prevents the fracture of a safety vent of a can due to high pressure during a process of molding a can and a protective circuit board in a mold using a resin.

In order to accomplish these and other objects, a mold is provided comprising: a lower mold including a first runner arranged on an upper surface thereof, the first runner having a predetermined depth and extending linearly a predetermined length, the first runner arranged to have a resin injected therein and to pass therethrough; at least one first gate having a predetermined depth and connected to the first runner, the at least one first gate arranged to guide the resin along a direction, the first gate having a first cavity formed on a side of the first runner and having a predetermined depth, the cavity arranged to accommodate a can and a protective circuit board therein, the can and the protective circuit board arranged to have a predetermined gap defined therebetween while being electrically connected to each other; and an upper mold having a second runner, a second gate, and a second cavity arranged on a lower surface thereof, the second runner having the same shape and arranged at a location corresponding to that of the first runner, the second gate having the same shape and arranged at a location corresponding to that of the first gate, and the second cavity having the same shape and arranged at a location corresponding to that of the first cavity.

The first and second cavities are preferably each of a rectangular shape having short and long sides, and wherein the first and second gates are arranged to be in communication with the gap with an angle of between 10° to 80° at a location of the long side of their respective cavity corresponding to the gap.

The first and second runners are preferably arranged parallel to the long side of their respective cavity.

The first and second gates preferably have slant surfaces arranged such that the closer to the gap between the can and the protective circuit board, the smaller the cross-sectional area through which the resin passes after passing through the first and second gates becomes.

In order to further accomplish these and other objects, a method is provided comprising: arranging a can to have a positive terminal on a front surface thereof, a negative terminal next to a side of the positive terminal, and a safety vent next to a side of the negative terminal; electrically connecting the positive and negative terminals of the can to a protective circuit board; arranging a mold to have a cavity of a predetermined depth, the cavity being arranged to integrally seat the can and the protective circuit board thereon to have a gate next to a side of the cavity to guide a flow of resin through a gap between the can and the protective circuit board and to have a runner to be in communication with the gate to guide the flow of resin; seating the can and the protective circuit board on the cavity of the mold to position the gate of the mold at a lateral portion of the gap between the can and the protective circuit board; and injecting a resin into the runner such that the resin passes through the gate and is injected into the gap between the can and the protective circuit board seated inside the cavity.

The method preferably further comprises positioning the safety vent of the can between the negative terminal and the gate.

The method preferably further comprises arranging a distance between the safety vent of the can and the gate to be smaller than a distance between the negative terminal and the gate.

The method preferably further comprises positioning the safety vent of the can adjacent to the gate.

The method preferably further comprising injecting the resin to pass through the safety vent of the can, the negative and positive terminals successively, the resin adhering to the safety vent of the can, the negative and positive terminals and filling the gap.

A resin injection trace preferably remains on a portion of the resin adjacent to the gate after injecting the resin.

A resin injection trace preferably remains on the lateral portion of the resin adjacent to the safety vent after injecting the resin.

The method preferably further comprises interposing an insulating sheet between the safety vent of the can and the protective circuit board.

In order to yet further accomplish these and other objects, a mold is provided comprising: a lower mold including a first runner arranged on an upper surface thereof, the first runner having a predetermined depth and extending linearly a predetermined length, the first runner arranged to have a molding substance injected therein and to pass therethrough; at least one first gate having a predetermined depth and connected to the first runner, the at least one first gate arranged to guide the molding substance along a direction, the first gate having a first cavity formed on a side of the first runner and having a predetermined depth, the cavity arranged to accommodate a can and a board therein, the can and the board arranged to have a predetermined gap defined therebetween while being electrically connected to each other; and an upper mold having a second runner, a second gate, and a second cavity arranged on a lower surface thereof, the second runner having the same shape and arranged at a location corresponding to that of the first runner, the second gate having the same shape and arranged at a location corresponding to that of the first gate, and the second cavity having the same shape and arranged at a location corresponding to that of the first cavity.

The first and second cavities are preferably each of a rectangular shape having short and long sides, and wherein the first and second gates are arranged to be in communication with the gap with an angle of between 10° to 80° at a location of the long side of their respective cavity corresponding to the gap.

The first and second runners are preferably arranged parallel to the long side of their respective cavity.

The first and second gates preferably have slant surfaces arranged such that the closer to the gap between the can and the protective circuit board, the smaller the cross-sectional area through which the molding substance passes after passing through the first and second gates becomes.

In order to yet further accomplish these and other objects, a method is provided comprising: arranging a can to have a first terminal on a front surface thereof, a second terminal next to a side of the first terminal, and a safety vent next to a side of the second terminal; electrically connecting the first and second terminals of the can to a board; arranging a mold to have a cavity of a predetermined depth, the cavity being arranged to integrally seat the can and the board thereon; arranging a gate next to a side of the cavity to guide a flow of a molding substance through a gap between the can and the board and arranging a runner to be in communication with the gate to guide the flow of a molding substance; seating the can and the board on the cavity of the mold to position the gate of the mold at a lateral portion of the gap between the can and the board; and injecting a molding substance into the runner such that the molding substance passes through the gate and is injected into the gap between the can and the board seated inside the cavity.

The method preferably further comprises positioning the safety vent of the can between the second terminal and the gate.

The method preferably further comprises arranging a distance between the safety vent of the can and the gate to be smaller than a distance between the second terminal and the gate.

The method preferably further comprises positioning the safety vent of the can adjacent to the gate.

The method preferably further comprises injecting the molding substance to pass through the safety vent of the can, the second and first terminals successively, the molding substance adhering to the safety vent of the can, the second and first terminals, and filling the gap.

A molding substance injection trace preferably remains on a portion of the molding substance adjacent to the gate after injecting the molding substance.

A molding substance injection trace preferably remains on the lateral portion of the molding substance adjacent to the safety vent after injecting the molding substance.

The method preferably further comprises interposing an insulating paper between the safety vent of the can and the board.

According to the mold for a battery of the present invention, as mentioned above, the runners, through which the resin is injected and passes, are formed parallel to the direction of the long sides of the cavities so that the resin travels the shortest path and the waste of the resin is minimized.

It is also possible to minimize the molding time using the resin, because the resin travels along the lateral portions of the cavities and then fills the gap between the can and the protective circuit board.

According to the method of molding a battery of the present invention, the safety vent of the can is not fractured by high pressure during a molding process, because the safety vent is positioned closest to the gate, the pressure of which is lower during the molding process.

Consequently, the safety vent can still work normally even after the completion of resin molding. This prevents the resin from being injected to the interior through the safety vent of the can or any electrolyte from leaking to the exterior.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Hereinafter, exemplary embodiments of the present invention will be described with reference to the accompanying drawings. In the following description and drawings, the same reference numerals are used to designate the same or similar components, and a repetition of the description of the same or similar components has been omitted.

Figure 1A:
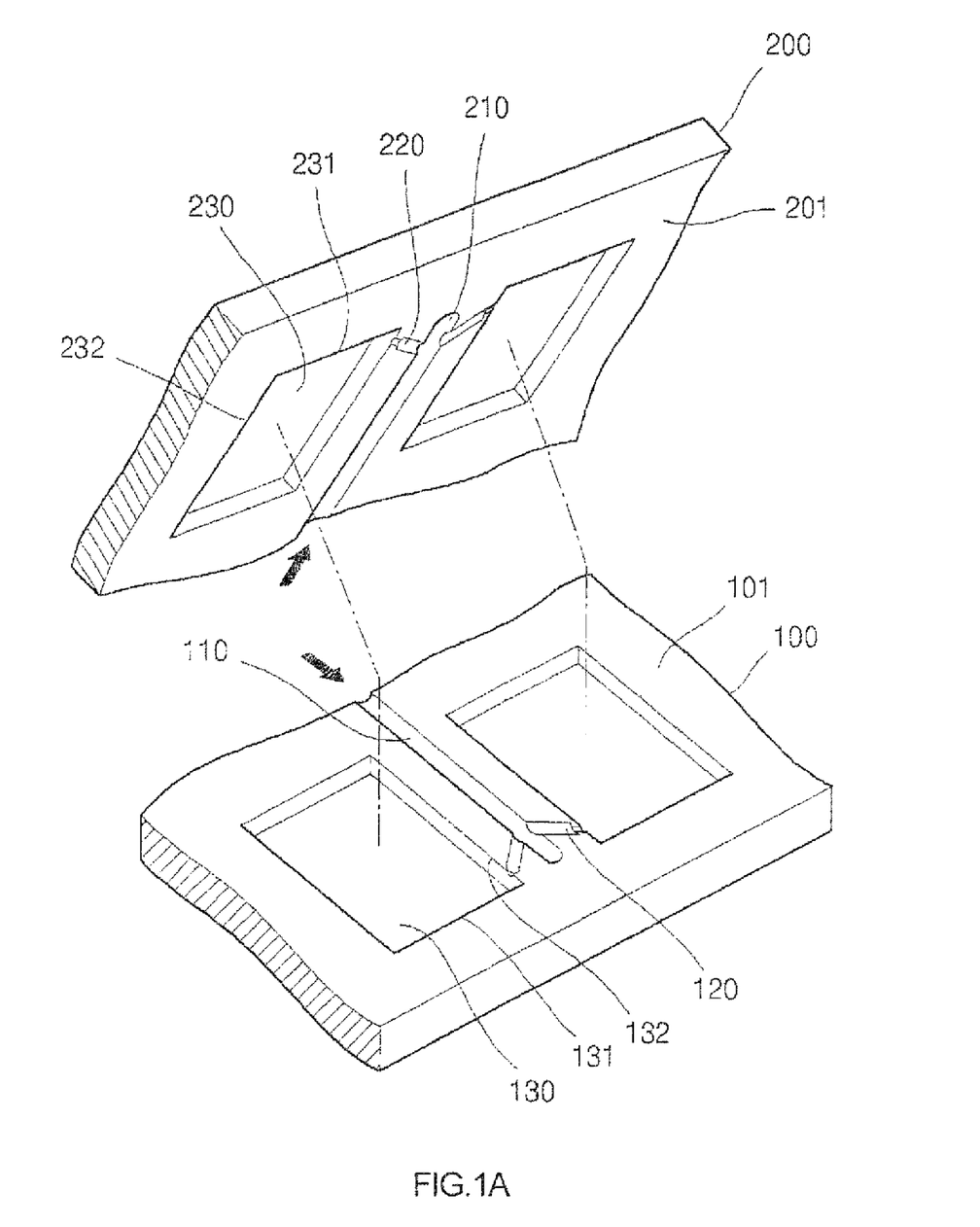
FIG. 1A is an exploded perspective view of a mold for a secondary battery according to an embodiment of the present invention.
Figure 1B:
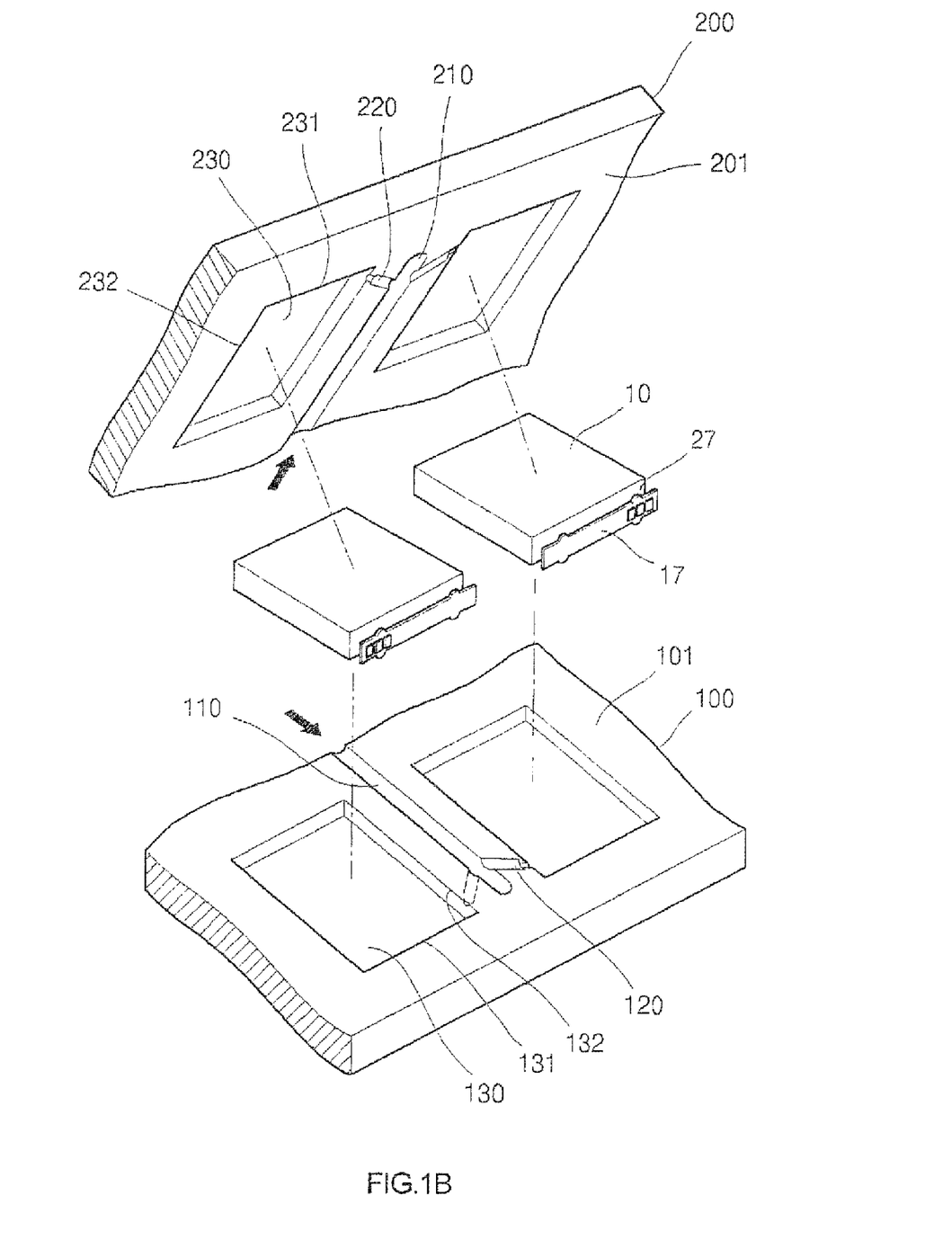
FIG. 1B is a perspective view of a can and a protective circuit board seated on the mold of FIG. 1.

FIG. 1A is an exploded perspective view of a mold for a secondary battery according to an embodiment of the present invention and referring to FIG. 1B is a view of the can and the protective circuit board seated on the mold of FIG. 1A.

A mold for a secondary battery according to an embodiment of the present invention includes a lower mold 100, on which a can 10 and a protective circuit board 17 are seated with a gap 27 defined between them, and an upper mold 200, which is fastened on top of the lower mold 100 so that a resin can be injected to fill the gap 27.

The lower mold 100 has a first runner 110 formed on its upper surface 101, which extends linearly a predetermined length and which has a predetermined depth, so that a resin can be injected and flow through it. At least one first gate 120 is formed to be in communication with the first runner 110 and to guide the resin along a direction which is angled relative to that of the runner 110. A first cavity 130 is formed next to a side of the first runner 110, which has a predetermined depth and is in communication with the first gate 120 so that a can 10 and a protective circuit board 17 can be seated thereon with a predetermined gap 27 defined between them while they are electrically connected to each other.

The first cavity 130 can be of a substantially rectangular shape having short and long sides 131 and 132. The first gate 120 is in communication with the long side 132 with an angle of 10° to 80° at a location corresponding to that of the gap 27. In other words, the first gate 120 is in communication with the gap 27 between the can 10 and the protective circuit board 27. Accordingly, a resin can be directly injected into the gap 27 after passing through the first gate 120. Of course, the first cavity 130 can also be of a regular square shape, instead of a rectangular shape, and the shape of the first cavity 130 is not limited in the present invention.

The first runner 110 can be formed parallel to the long side 132 of the first cavity 130 for minimized length. This arrangement makes it possible to minimize the amount of resin remaining in the first runner 110 and the first gate 120 after completion of molding, and to shorten the time for injecting a resin. Even when the first cavity 130 is of a substantially regular square shape, the first runner 110 can, of course, still be formed parallel to a side thereof.

The upper mold 200 has the same shape as the lower mold 100. In particular, the upper mold 200 has a second runner 210 formed on its lower surface 201, which is fastened on the upper surface 101 of the lower mold 100, in the same shape at a location corresponding to that of the first runner 110. The upper mold 200 also has a second gate 220 formed in the same shape at a location corresponding to that of the first gate 120 and a second cavity 230 formed in the same shape at a location corresponding to that of the first cavity 130. The second cavity 230 can, of course, be of a rectangular shape having short and long sides 231 and 232.

The resin flows into the gap 27 between the cap 10 and the protective circuit board 17 along a direction as marked by a solid arrow in the drawing.

According to another aspect of the present invention, a method of molding a secondary battery includes: electrically connecting a can and a protective circuit board to each other; providing a mold; seating the can and the protective circuit board on the mold, and filling the mold with a resin.

Figure 2A:
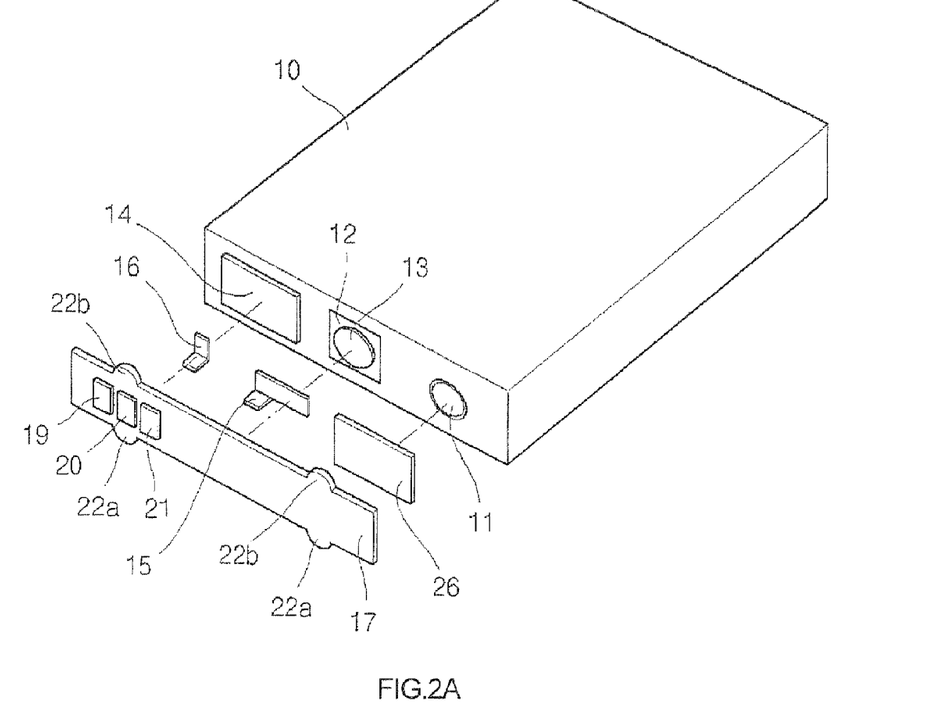
FIG. 2A is an exploded perspective view of a can and a protective circuit board which are to be molded by a mold for a secondary battery according to an embodiment of the present invention.
Figure 2B:
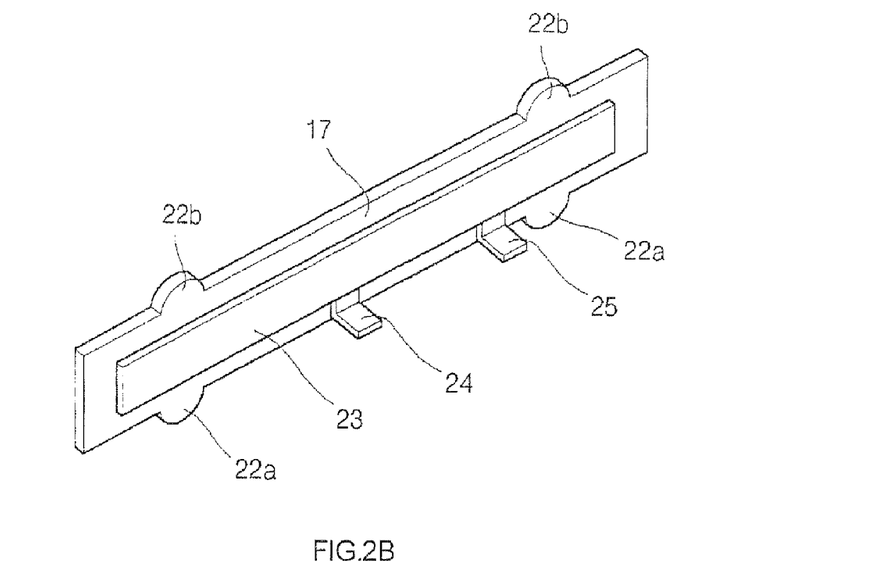
FIG. 2B is a perspective view of the rear side of a protective circuit board.

Electrically connecting a can and a protective circuit board to each other is described below with reference to FIGS. 2A and 2B.

A front surface of the can 10 is provided with a safety vent 11, a negative terminal 13 surrounded by an insulator 12, and a positive terminal 14. The negative terminal 13 is coupled to a negative lead 15 and the positive terminal 14 is coupled to a positive lead 16. The can 10 has a substantially rectangular-shaped protective circuit board 17 positioned in front of the can 10 to protect the battery from overcharging, over-discharging, an over-current, a short due to external load, and the like. A front surface of the protective circuit board 17 is provided with a type determination terminal 19, an external negative terminal 20, and an external positive terminal 21. The protective circuit board 17 also has a number of round protrusions 22a and 22b formed on the upper and lower portions thereof, which protrude to the exterior and are to be interlocked with a resin later. An insulating paper 26 can be additionally interposed between the protective circuit board 17 and the can 10 to prevent the negative lead 15 from contacting the positive region of the can 10 and the safety vent 11 fractured by high pressure during resin filling.

A rear surface of the protective circuit board 17 is provided with a protective circuit portion 23, a negative connection terminal 24 to which the negative lead 15 is connected, and a positive connection terminal 25 to which the positive lead 16 is connected.

Seating the can and the protective circuit board on the mold is described below with reference to FIGS. 3A to 3E.

Figure 3A:
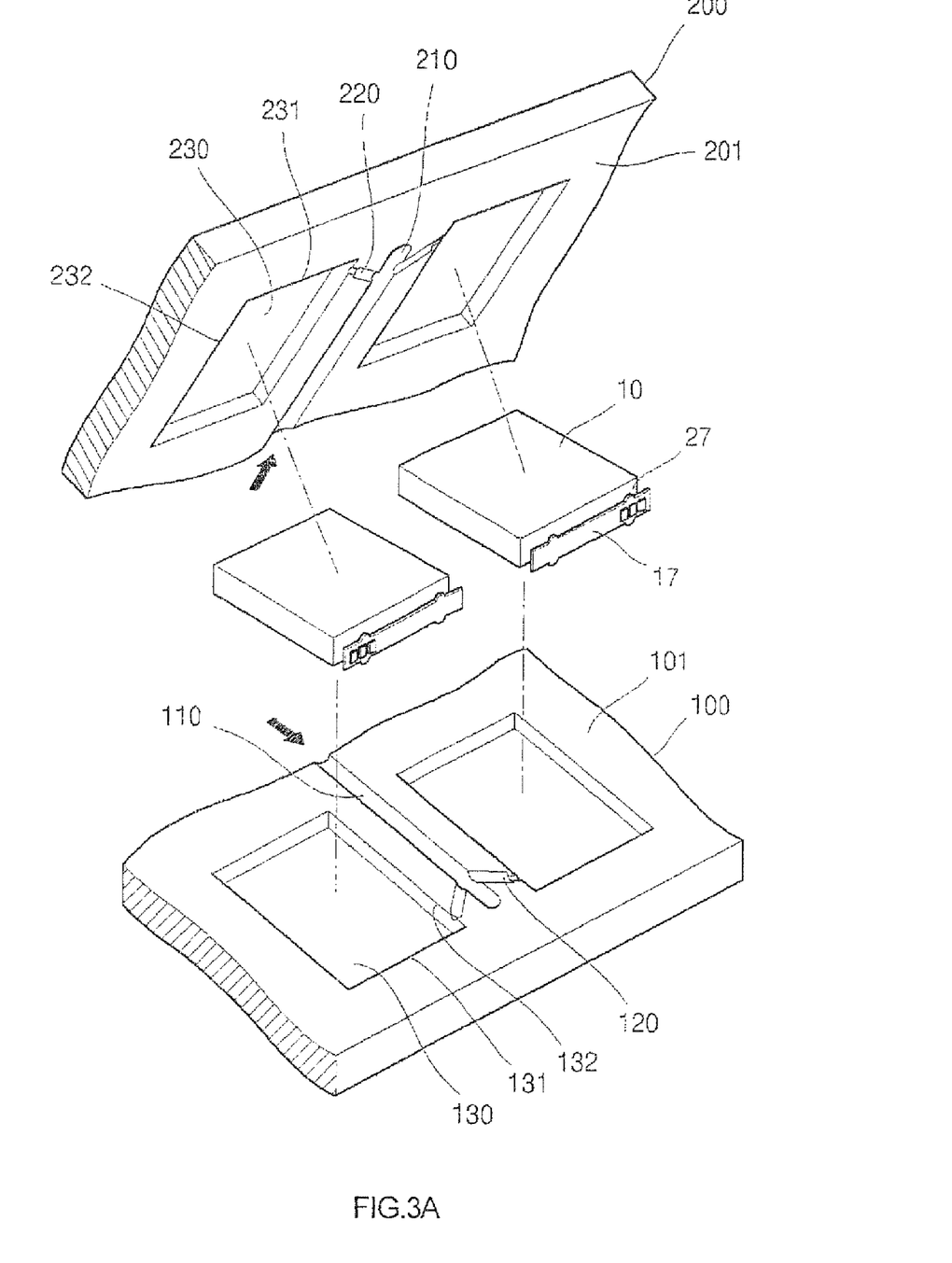
FIG. 3A is a perspective view of seating a can and a protective circuit board on a mold during a method of molding a secondary battery according to an embodiment of the present invention.
Figure 3B:
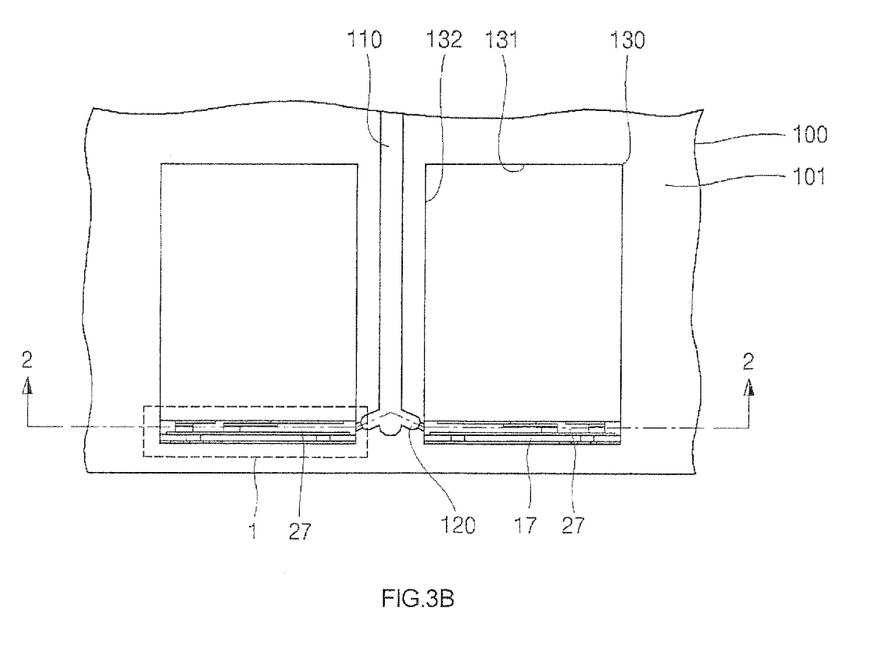
FIG. 3B is a top view of a can and a protective circuit board seated on a lower mold with an upper mold omitted.
Figure 3C:
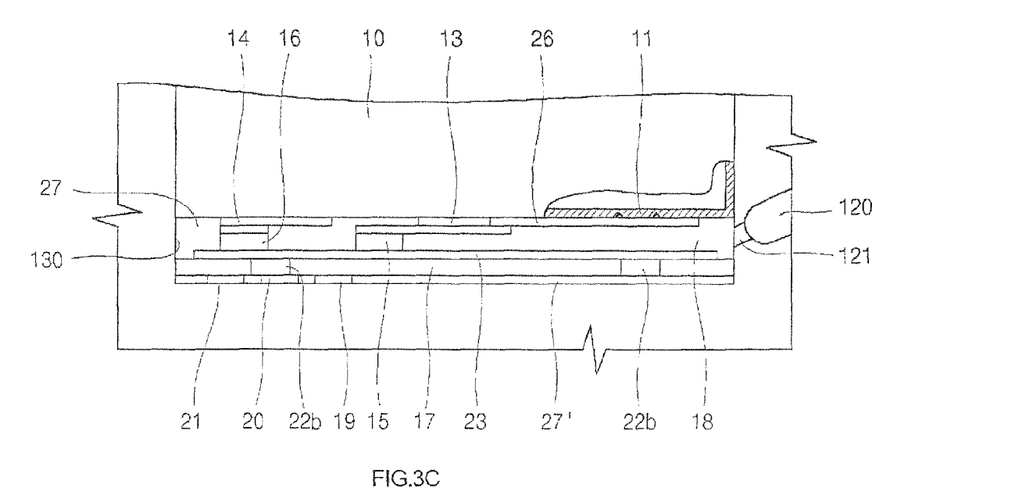
FIG. 3C is a top view magnifying an area 1 of FIG. 3B.
Figure 3D:
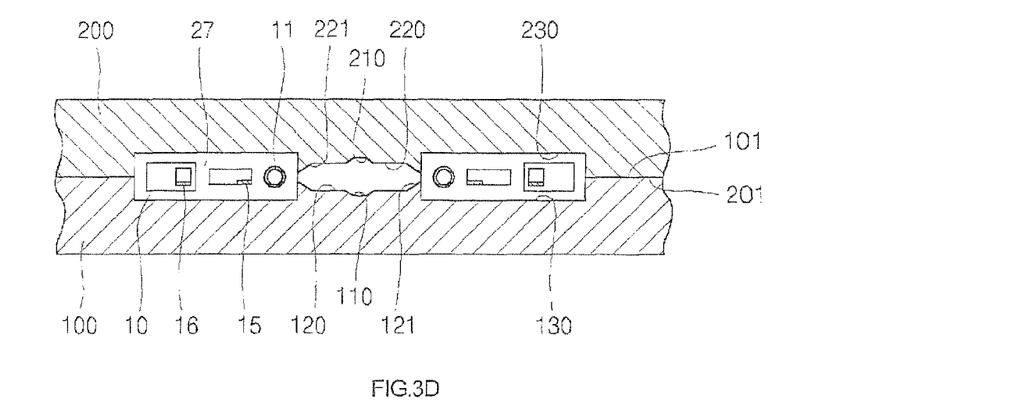
FIG. 3D is a sectional view taken along line 2-2 of FIG. 3B.

FIG. 3A is a perspective view of the can and the protective circuit board seated on the mold. FIG. 3B is a top view of the can and the protective circuit board seated on a lower mold without an upper mold. FIG. 3C is a top view magnifying area 1 of FIG. 3B and FIG. 3D is a sectional view taken along line 2-2 of FIG. 3B.

The can 10 and the protective circuit board 17 are seated between the first cavity 130, which is formed on the upper surface 101 of the lower mold 100, and the second cavity 230, which is formed on the lower surface 201 of the upper mold 200.

The gap 27 between the can 10 and the protective circuit board 17 is positioned in such a manner that it faces the first and second gates 120 and 220. In particular, the safety vent 11, which is formed on the can 10 with a smaller wall thickness than that of the remainder of the can 10, is positioned closest to the first and second gates 120 and 220. Specifically, the safety vent 11 is positioned between the negative terminal 13 and the first and second gates 120 and 220. In other words, the distance between the safety vent 11 and the first and second gates 120 and 220 is smaller than that between the negative terminal 13 and the first and second gates 120 and 220. More particularly, the safety vent 11 of the can 10, the negative lead 15, and the positive lead 16 are positioned successively from the first and second gates 120 and 220. The safety vent 11 is positioned at the right ends of the first and second cavities 130 and 230, which are closest to the first and second gates 120 and 220, the negative lead 15 is positioned near the center of the first and second cavities 130 and 230, and the positive lead 16 is positioned at the left ends of the first and second cavities 130 and 230, as shown in FIG. 3C. Of course, the location of the gap 27 between the can 10 and the protective circuit board 17 can be identical to that of the first and second gates 120 and 220, as mentioned above. As a result, the gap 27 can easily be filled with the resin, which has passed through the first and second runners 110 and 210 and the first and second gates 120 and 220. The first and second gates 120 and 220 can have slant surfaces 121 and 221 of a smaller width so that the closer to the gap 27 between the can 10 and the protective circuit board 17, the smaller the cross-sectional area, through which the resin passes after passing through the first and second gates 120 and 220, becomes.

Figure 4A:
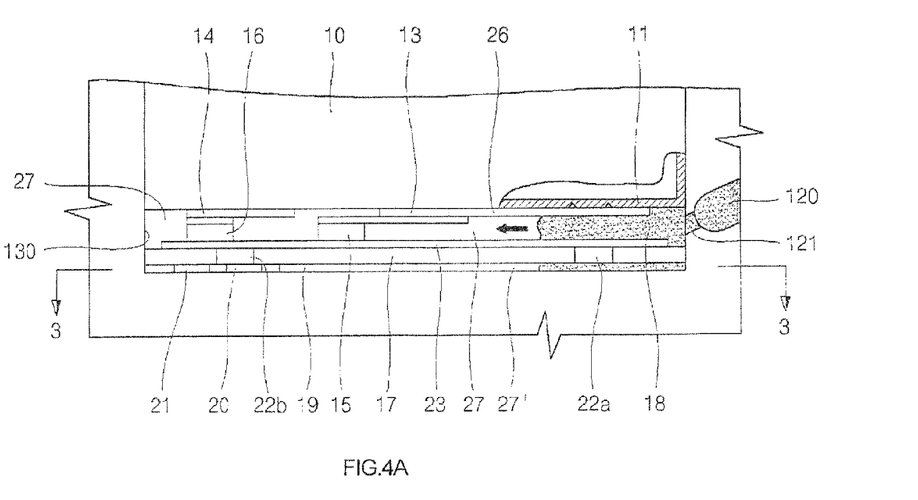
FIG. 4A is a top view of the gap between a can and a protective circuit board being filled with a resin during a method of molding a secondary battery according to an embodiment of the present invention.
Figure 4B:
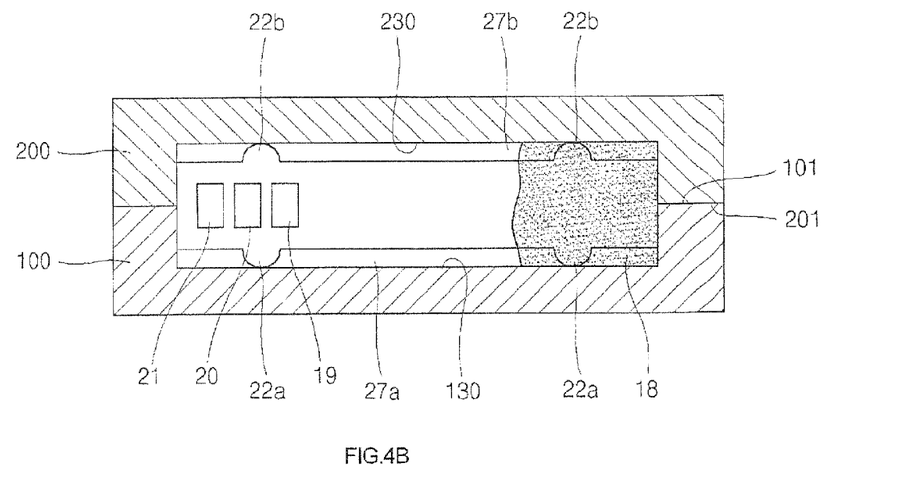
FIG. 4B is a sectional view taken along line 3-3 of FIG. 4A.

FIG. 4A is a view of the gap 27 between the can 10 and the protective circuit board 17 being filled with a resin during the method for molding a secondary battery according to an embodiment of the present invention and FIG. 4B is a sectional view taken along line 3-3 of FIG. 4A.

After the can 10 and the protective circuit board 17 are seated, a resin 18 of high temperature and high pressure (temperature: about 200-300 degrees, pressure: about 0.5-1.0 MPa) is injected through the first and second runners 110 and 120. The injected resin 18 then passes through the first and second gates 120 and 220, which are formed in the shape of a tree together with the first and second runners 110 and 210, and is moved toward the first and second cavities 130 and 230 for filling. In particular, the resin 18 fills the gap 27 between the can 10 and the protective circuit board 17. As mentioned above, the resin 18 adheres successively to the safety vent 11 of the can 10, the negative and positive leads 15 and 16. Finally, the resin 18 completely retains the can 10 and the protective circuit board 17 in a mechanical fashion.

The air pressure established in the gap 27 has the smallest value at a point of time when the resin 18 has passed through the first and second gates 120 and 220. This is because the air remaining in the gap 27 has not yet been compressed very much by the resin 18. In such a low-pressure state, the resin 18 goes past the safety vent 11, particularly the insulating paper 26 fastened on the surface thereof, and the safety vent 11 is not subject to high pressure.

After going past the safety vent 11 and the negative lead 15, the resin 18 approaches the positive lead 26 and greatly compresses the air. This increases the air pressure drastically. However, the can 10 is not easily fractured by such a high pressure, because the can 10, which is connected to the positive lead 26 and the positive terminal 14, has no thin wall region located at the high pressure area.

As shown in FIG. 4B, a round protrusion 22a formed on the lower portion of the protective circuit board 17 is forced against the bottom surface of the cavity 130 of the lower mold 100 and a round protrusion 22b formed on the upper portion is forced against the bottom surface of the cavity 230 of the upper mold 200. As a result, a predetermined gap 27a is formed between the protective circuit board 17 and the first cavity 130 of the lower mold 100 and a predetermined gap 27b is formed between the protective circuit board 17 and the second cavity 230 of the upper mold 200 by the round protrusions 22a and 22b. Of course, a type determination terminal 19, an external negative terminal 20, and an external positive terminal 21, which are formed on the protective circuit board 17, are forced against the lateral wall of the first cavity 130 of the lower mold 10 and against that of the second cavity 230 of the upper mold 200. Accordingly, when the gap 27 between the can 10 and the protective circuit board 17 is filled with a resin during a resin filling process, the space 27', which is defined at the front to surface of the protective circuit board 17 by the gaps 27a and 27b, is also filled with the resin simultaneously. Of course, the resin cannot reach the surfaces of the terminals 19, 20, and 21, because they are forced against the lateral surfaces of the first and second cavities 130 and 230.

Figure 5:
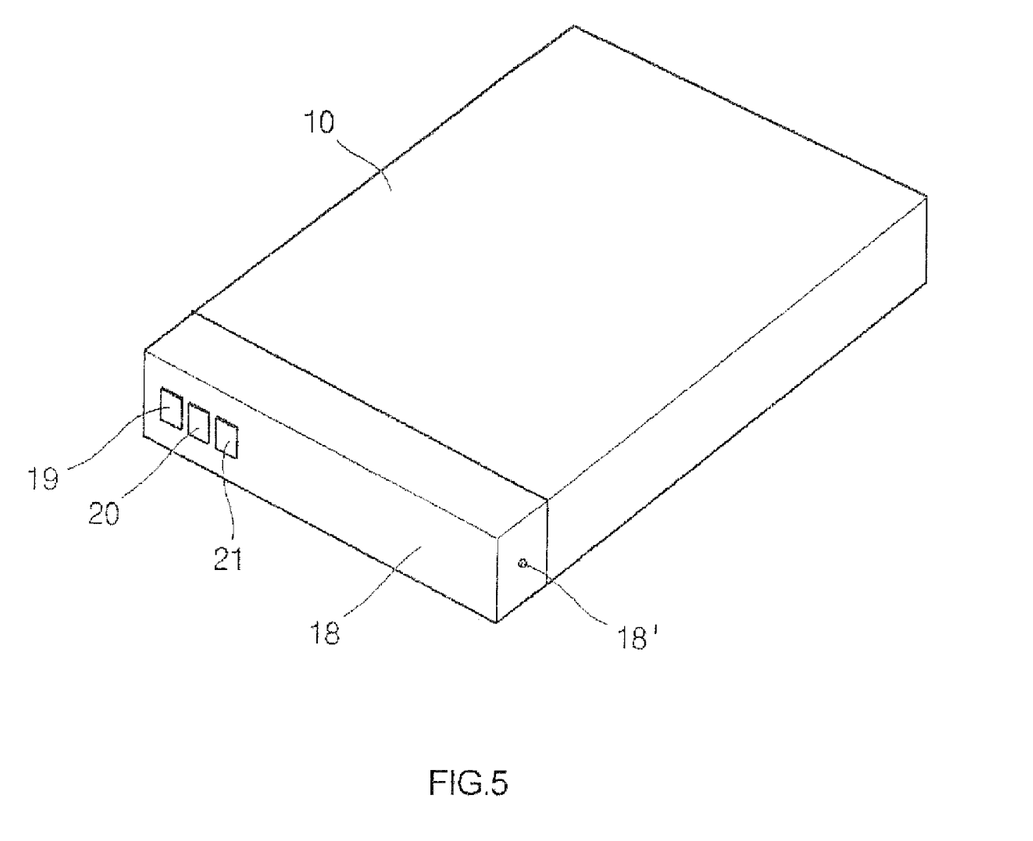
FIG. 5 is a perspective view of a secondary battery which has been molded according to an embodiment of the present invention.

FIG. 5 is a perspective view of a secondary battery which has been molded according to a method of molding a secondary battery according to an embodiment of the present invention.

A resin 18 completely retains a protective circuit board (not shown) on a can 10 in a mechanical fashion. Of course, the above-mentioned type determination terminal 19, external negative terminal 20, and external positive terminal 21 are exposed from the front surface of the resin 18 for type determination and easy charging and discharging. A round protrusion (not shown) of the protective circuit board 17 is also completely surrounded by the resin 18, so that the protective circuit board 17 is retained on the can 10 in a more stable manner.

After the removal of the secondary battery, any resin 18 remaining in the first runner 110 and the first gate 120 in a hardened state is removed and another resin filling process is performed successively for another can and protective circuit board.

Reference numeral 18' refers to a remaining trace of the resin 18 which has passed through the first and second gates 120 and 220. In particular, physical separation occurs between the resin 18 and a resin remnant, which remains in the first and second gates 120 and 220, when the secondary battery is removed from the mold after the completion of the molding process, and the trace 18' of the separation is left. Of course, a safety vent 11 is formed on the can 10, which is closest to the trace 18'.

As mentioned above, the mold for a secondary battery according to the present invention is advantageous in that the runners, through which a resin is injected and passes, are formed parallel to the direction of the long sides of cavities so that the resin travels the shortest path and the waste of the resin is minimized.

It is also possible to minimize the molding time using the resin, because the resin travels along the lateral portions of the cavities and then fills the gap between the can and the protective circuit board.

According to the method for molding a secondary battery of the present invention, the safety vent of the can is not fractured by high pressure during a molding process, because the safety vent is positioned closest to the gate, the pressure of which is lower during the molding process.

Consequently, the safety vent can still work normally even after the completion of resin molding. This prevents the resin from being injected to the interior through the safety vent of the can or any electrolyte from leaking to the exterior.

Although exemplary embodiments of the present invention have been described for illustrative purposes, those skilled in the art will appreciate that various modifications, additions and substitutions are possible, without departing from the scope and spirit of the present invention as recited in the accompanying claims.

What is claimed is:

1. A mold, comprising:
   a lower mold including a first runner arranged on an upper surface thereof, the first runner having a predetermined depth and extending linearly a predetermined length, the first runner arranged to have a resin injected therein and to pass therethrough;
   at least one first gate having a predetermined depth and connected to the first runner, the at least one first gate arranged to guide the resin along a direction, the first gate having a first cavity formed on a side of the first runner and having a predetermined depth;
   a can disposed within the first cavity having a positive terminal, a negative terminal, a safety vent next to a side of the negative terminal and a protective circuit board therein, the can and the protective circuit board arranged to have a predetermined gap defined therebetween while being electrically connected to each other; and
   an upper mold having a second runner, a second gate, and a second cavity arranged on a lower surface thereof, the second runner having the same shape and arranged at a location corresponding to that of the first runner, the second gate having the same shape and arranged at a location corresponding to that of the first gate, and the second cavity having the same shape and arranged at a location corresponding to that of the first cavity,
   wherein the first gate is positioned to be adjacent to the safety vent of the can.

2. The mold as recited in claim 1, wherein the first and second cavities are each of a rectangular shape having short and long sides, and wherein the first and second gates are arranged to be in communication with the gap with an angle of between 10° to 80° at a location of the long side of their respective cavity corresponding to the gap.

3. The mold as recited in claim 2, wherein the first and second runners are arranged parallel to the long side of their respective cavity.

4. The mold as recited in claim 1, wherein the first and second gates have slant surfaces arranged such that the closer to the gap between the can and the protective circuit board, the smaller the cross-sectional area through which the resin passes after passing through the first and second gates becomes.

5. A mold, comprising:
   a lower mold including having at least two cavities with a first runner arranged on an upper surface thereof, the first runner having a predetermined depth and extending linearly a predetermined length, the first runner arranged to have a molding substance injected therein and to pass therethrough;
   at least one first gate having a predetermined depth and connected to the first runner, the at least one first gate arranged to guide the molding substance along a direction, the first gate connected to the two cavities having the first runner deposed between the two cavities and having a predetermined depth;
   a first can disposed in one of the two cavities of the lower mold having a positive terminal, a negative terminal, a safety vent next to a side of the negative terminal and a board therein, the first can and the board arranged to have a predetermined gap defined therebetween while being electrically connected to each other; and
   an upper mold having a second runner, a second gate, and another two cavities arranged on a lower surface thereof, the second runner having the same shape and arranged at a location corresponding to that of the first runner, the second gate having the same shape and arranged at a location corresponding to that of the first gate, and the another two cavities having the same shape and arranged at a location corresponding to that of the at least two cavities of the lower mold;
   a second can disposed in the other of the two cavities of the lower mold having a positive terminal, a negative terminal, a safety vent next to a side of the negative terminal and a board therein, the can and the board arranged to have a predetermined gap defined therebetween while being electrically connected to each other,
   wherein the first gate is positioned to be adjacent to safety vent of the first can and the second gate is positioned to be adjacent to safety vent of the second can.

6. The mold as recited in claim 5, wherein the two cavities of both the upper and lower are each of a rectangular shape having short and long sides, and wherein the first and second gates are arranged to be in communication with the gap with an angle of between 10° to 80° at a location of the long side of their respective cavity corresponding to the gap.

7. The mold as recited in claim 6, wherein the first and second runners are arranged parallel to the long side of their respective cavities.

8. The mold as recited in claim 5, wherein the first and second gates have slant surfaces arranged such that the closer to the gap between the first and second can and the protective circuit board, the smaller the cross-sectional area through which the molding substance passes after passing through the first and second gates becomes.

* * * * *